US007327702B2

(12) United States Patent
Lucidarme

(10) Patent No.: US 7,327,702 B2
(45) Date of Patent: Feb. 5, 2008

(54) VARIABLE RADIATION PATTERN RADIOCOMMUNICATION BASE STATION

(75) Inventor: Thierry Lucidarme, Montigny le Bretonneux (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 977 days.

(21) Appl. No.: 10/477,408

(22) PCT Filed: Jul. 30, 2002

(86) PCT No.: PCT/FR02/02741

§ 371 (c)(1),
(2), (4) Date: Nov. 7, 2003

(87) PCT Pub. No.: WO03/012917

PCT Pub. Date: Feb. 13, 2003

(65) Prior Publication Data

US 2004/0141529 A1 Jul. 22, 2004

(30) Foreign Application Priority Data

Jul. 30, 2001 (FR) .................................. 01 10187

(51) Int. Cl.
*H04J 1/06* (2006.01)

(52) U.S. Cl. ...................... 370/328; 375/299; 342/368; 343/777

(58) Field of Classification Search ................ 370/328; 342/367, 368; 375/347, 295–315; 455/562.1, 455/101; 343/777
See application file for complete search history.

(56) References Cited

U.S. PATENT DOCUMENTS

| | | | | | |
|---|---|---|---|---|---|
| 5,303,240 | A | * | 4/1994 | Borras et al. | 370/347 |
| 5,848,103 | A | * | 12/1998 | Weerackody | 375/295 |
| 5,977,910 | A | * | 11/1999 | Matthews | 342/368 |
| 6,070,090 | A | | 5/2000 | Feuerstein | |
| 6,091,788 | A | * | 7/2000 | Keskitalo et al. | 375/347 |
| 6,104,935 | A | * | 8/2000 | Smith et al. | 455/562.1 |
| 6,147,645 | A | * | 11/2000 | Yukitomo et al. | 342/372 |
| 6,198,458 | B1 | | 3/2001 | Heinz et al. | |
| 6,480,154 | B1 | | 11/2002 | Bella et al. | |

FOREIGN PATENT DOCUMENTS

| | | |
|---|---|---|
| EP | 0 877 444 | 11/1998 |
| FR | 2 792 116 | 10/2000 |

* cited by examiner

*Primary Examiner*—Min Jung
(74) *Attorney, Agent, or Firm*—Trop, Pruner & Hu, P.C.

(57) ABSTRACT

The invention concerns a base station (100) comprising a transmission antenna (1) consisting of several radiating elements (2) for transmitting one or more radio signals ($E_1$, $E_2$, , $E_N$) to one or more addressee terminals (200). Said radio signals are generated from signal components ($S_1$, $S_2$, , $S_M$) to which are applied phase shifts ($D_1$, $D_2$, , $D_N$). The adjustment of said phase shifts brings about a systematic fluctuation of at least one transmitting direction of the antenna during the transmission of the radio signal, so as to provide diversity of propagation paths.

17 Claims, 4 Drawing Sheets

VARIABLE RADIATION PATTERN RADIOCOMMUNICATION BASE STATION

TECHNICAL FIELD

The subject of the present invention is the transmitting of signals between two mutually remote transceivers. It relates more particularly to the transmitting and the receiving of signals by a base station linked by radio to radiocommunication terminals.

BACKGROUND OF THE INVENTION

It is known that communication by radio between a base station and a terminal, possibly a mobile terminal, is subject to phenomena that disturb the radio transmission between the antenna of the base station and the antenna of the mobile terminal, in particular to channel fadings due to destructive interference between signals which follow different propagation paths between the base station and the terminal.

The diversity of one of the features related to this transmission is one of the methods developed for alleviating fading. Thus, use is made of reception diversity, consisting in receiving the signal simultaneously on two antennas, transmission diversity, consisting in equipping the base station with several antennas transmitting the same signals, polarization diversity, frequency diversity (see for example the work “Réseaux GSM” [GSM networks] by X. Lagrange et al, published by Hermes Science Publications, 2000, page 161), etc.

It is known practice to use antennas comprising devices for altering the radiation pattern. Such adjustments pertain for example to the direction of transmission of the antenna or the width of the main transmission lobe.

These alterations of the radiation pattern may be mechanical, such as the orienting of an antenna arranged on an articulated support, mixed electrical/mechanical (cf. patent U.S. Pat. No. 6,198,458), or else purely electronic, as in FR-A-2 792 116.

Most antennas with electronic steering of the beam are composed of several antenna elements individually fed with signals obtained by phase shifting an initial signal. The value of the phase shift is determined as a function of the antenna element to which the phase-shifted signal is addressed, and the direction of transmission by the antenna results from the combining of the mutually phase-shifted signals transmitted by all the antenna elements.

Such antennas are sometimes used to focus a radio beam intended for a particular terminal. In a particular embodiment, the components of an up radio signal transmitted by the terminal and which are picked up by the various antenna elements, are analyzed in terms of phase shifts so as to estimate a direction in space from which this up signal originates. Corresponding phase shifts are then applied to the down signal intended for this terminal so that its transmission is oriented in this direction. Such electronic steering of the beam allows considerable reductions in interference level. It is used especially in satellite antennas. It has however been proposed that it be used in terrestrial systems in spite of its complex and expensive implementation.

An object of the present of the invention is to propose a novel radio diversity mode at the level of a base station.

SUMMARY OF THE INVENTION

The subject of the present invention is a base station comprising at least one transmission antenna composed of several radiating elements, production means for producing at least one signal component, transmitting means for addressing, to the radiating elements of the transmission antenna, radio signals generated from the signal components emanating from the production means, the transmitting means including phase adaptation means for producing phase shifts in the radio signals addressed to the radiating elements and means of control of a transmission pattern of the antenna by adjustment of said phase shifts, characterized in that the means of control comprise means for causing certain at least of said phase shifts to vary over time in such a way as to induce a systematic fluctuation in the direction of at least one transmission lobe of the antenna about a reference direction.

The present invention therefore proposes a diversity mechanism based on the transmitting of sequences of the radio signal along different propagation paths between the base station and the terminal, and which is applicable with a single transmission antenna. The fluctuation in the direction of a transmission lobe induces variations between the propagation paths followed by successive sequences of the signal, thus preventing all the sequences from being disturbed in an identical manner.

In a preferred embodiment, the phase adaptation means and the means of control of the transmission pattern are entirely electronic in nature and allow digital alteration of the phase shift of the signal transmitted by each radiating element. Such processing of the phase shifts in fact affords possibilities of altering the phase shifts greater than those of systems incorporating electromechanical parts, as well as particularly fast variations of said phase shifts.

The fluctuations in the direction of a transmission lobe of the antenna that are induced by the variations in the phase shifts are determined according to a sequence fixed previously. These fluctuations may for example be adapted as a function of the topography of the geographical zone covered by the antenna, favoring in particular transmission sectors according to which the transmitting of the signals is particularly efficient.

In a preferred mode of implementation, the means of control are devised to vary the phase shifts in such a way as to cause the direction of the transmission lobe of the antenna to fluctuate by discrete jumps, for example between two chosen directions on either side of a reference direction. These fluctuations may result from the execution of a program dedicated for this purpose, controlling these fluctuations in the form of iterative sequences, or using a random procedure. The program may moreover comprise certain parameters adaptable by the operator of the base station.

Preferably, the systematic fluctuation in the direction of the transmission lobe is independent of the destination terminals of the signal components.

The fluctuation in the direction of a transmission lobe is applied about a reference direction tied to this lobe. The base station can furthermore comprise means of orientation of the reference direction towards at least one destination terminal for at least one signal component. Optionally, when the destination terminal is mobile and when its movement is identified by the base station from the radio signals transmitted by this terminal, the reference direction of the transmission lobe may vary in such a way as to follow the movement of the mobile terminal. The fluctuation in the direction of the transmission lobe is then superimposed on the variation in the reference direction of this same lobe. Generally, the fluctuation imposed on the direction of the transmission lobe is much faster than the variation in the reference direction of this lobe.

The same principle of diversity is applied to the reception by the base station of the radio signals transmitted by the remote mobile terminals. During the reception of the signal, at least one direction of a reception lobe is modified in such a way as to receive a complete radio signal in the form of signal sequences that have followed different propagation paths between the terminal and the base station.

In general, the transmission antenna of a base station is also used for the reception of signals by this station. Likewise, part of the signal processing devices associated with the antenna are common to transmission and to reception. It is consequently understood, within the context of the present invention, that the mechanisms described relating to the transmission of a signal with diversity obtained by fluctuation of at least one direction of transmission of the antenna may be applied, by simple transposition, to the reception of signals with diversity corresponding to the fluctuation in at least one direction of reception of the antenna. Moreover, certain components used to cause a direction of transmission to fluctuate, in particular the phase adaptation means and the means of control of the transmission pattern may also be used during reception. In a preferred mode of operation, the fluctuations in the direction or directions of reception reproduce a priori the fluctuations in the direction or directions of transmission. However, the capability of the algorithms for processing the signals at reception make it possible to modify or to transform at will the characteristics of the fluctuations in the directions of reception so as to make them different if necessary from the characteristics of the fluctuations in the directions of transmission.

The invention therefore also relates to a base station comprising at least one reception antenna composed of several antenna elements, phase adaptation means for applying respective phase shifts to signal components emanating from the antenna elements, means of control of a reception pattern of the antenna by adjustment of said phase shifts, and means for processing at least one signal constructed after combination of the phase-shifted signal components, characterized in that the means of control comprise means for causing said phase shifts to vary over time in such a way as to induce a systematic fluctuation in the direction of at least one reception lobe of the antenna about a reference direction.

DESCRIPTION OF PREFERRED EMBODIMENTS

Figure 1:
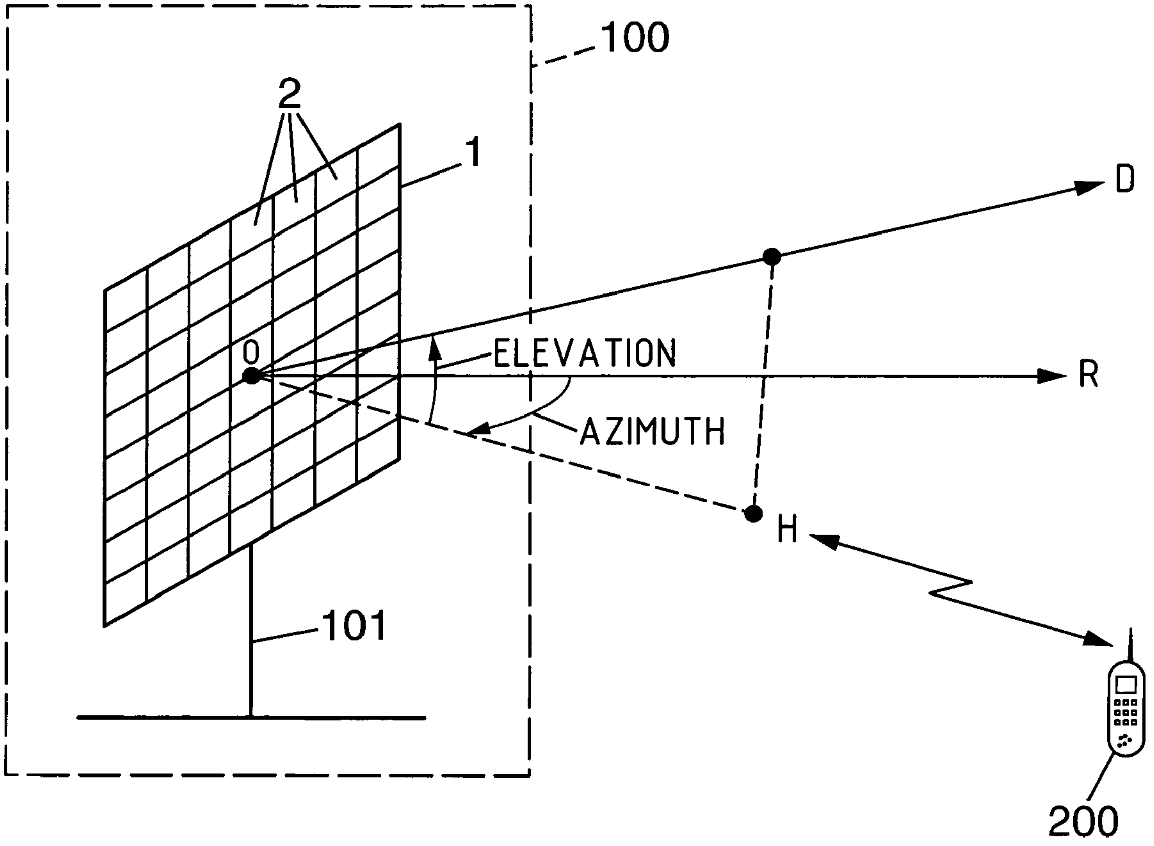
FIG. 1 represents a system of spherical coordinates making it possible to characterize a direction of transmission or reception of the antenna of a base station.

In FIG. 1, the base station 100 transmits by means of the antenna 1 a radio signal intended for terminals 200 situated within range of this antenna. The antenna 1 consists of juxtaposed radiating elements 2. All these radiating elements 2 are fixed with respect to the support of the antenna 101, and oriented facing the geographical sector intended to be served by the antenna.

The transmission pattern of the antenna generally consists of a main lobe, corresponding to an angular sector inside which the radiation power is greater than a fixed value, and limited according to the separation with respect to the antenna by the reduction in power related to the propagation of the radiation. The axis of this main lobe corresponds to the direction D of transmission of the antenna 1.

The direction D of transmission can be charted by a system of spherical coordinates having as pole the centre O of the antenna 1. These coordinates comprise for example the angle of elevation of the direction D of transmission with respect to a horizontal plane containing the point O, and the angle of azimuth between the projection of the direction D onto the horizontal plane and a reference axis R contained in this plane, for example oriented perpendicularly to the grouping of radiating elements and passing through the point O.

Usually, a radio transmission/reception site comprises a base station of cellular type which radiates different radio signals in distinct transmission and reception sectors, each sector being served by a directional antenna of the above type.

The fluctuations in the direction D of transmission of the antenna 1 are then charted through the evolution of the angles of elevation and of azimuth. Thus, a fluctuation in the direction D lying in a vertical plane corresponds to a variation in the angle of elevation. A fluctuation lying in a horizontal plane corresponds to a variation in the angle of azimuth.

In a typical embodiment of the invention, the fluctuation in the direction D of transmission, effected collectively for all the terminals independently of their location, pertains essentially to the angle of elevation. However, the angle of azimuth or a combination of the two angles can also be made to vary.

In most digital radiocommunications systems, the signals are transmitted after application of a channel coding and of an interleaving. The channel coding adds redundancy to the symbols of the digital signal, with a structure allowing the receiver to detect and correct the transmission errors. The codes customarily employed have optimal performance when the errors arising in the course of transmission are uncorrelated. The interleaving consists of a permutation of the symbols that is intended to tend towards this condition of non correlation while the transmission errors on a radio interface have a tendency rather more to arise through packets on account of the fading phenomenon. The permutation of the interleaving pertains to a certain duration (of a few tens of milliseconds) chosen to achieve a compromise between the performance of the decoder and the processing delay which the interleaver entails. This interleaving duration may vary from one channel to another, such as for example in the case of a UMTS ("Universal Mobile Telecommunication System") system where it is from 10 to 80 ms.

In order to optimize the effectiveness of the diversity created by fluctuation of the direction of transmission of the antenna 1, it is advantageous for these variations to be performed according to a frequency of the order of, and preferably greater than the inverse of the interleaving duration. Thus, in the case of a UMTS system, the frequency of variation is advantageously equal to or greater than 100 Hz.

Figure 2:
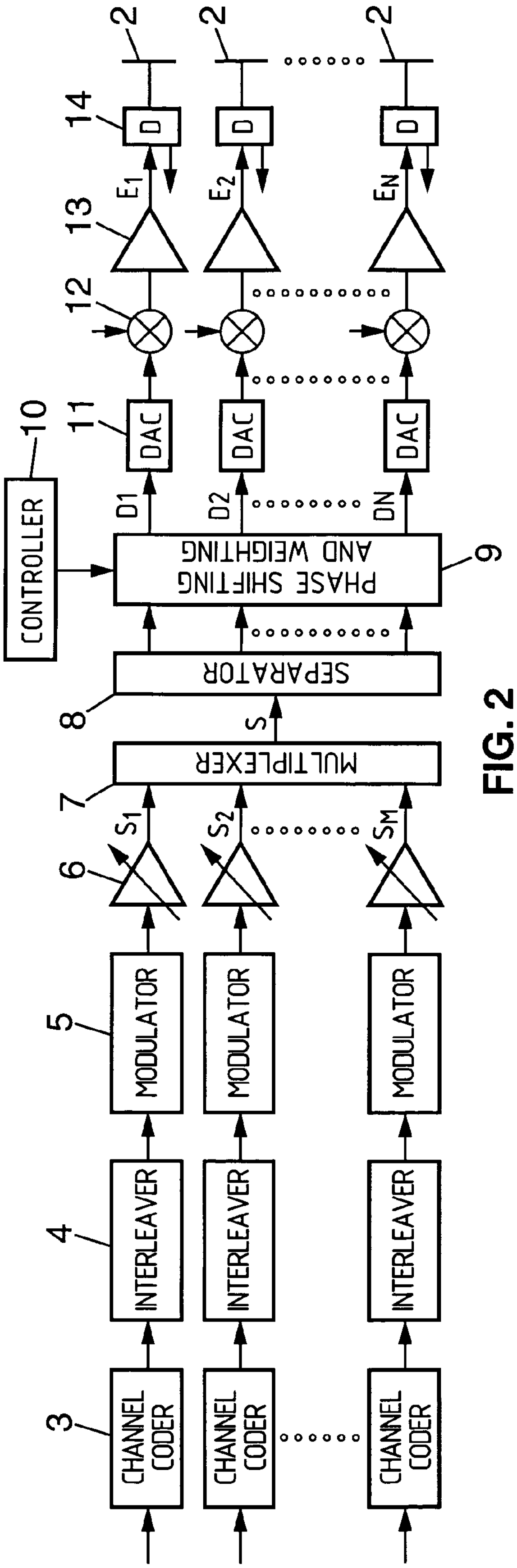
FIG. 2 illustrates a first embodiment of a device used to control the fluctuations in a direction of transmission of the antenna.

FIG. 2 diagrammatically shows a first exemplary embodiment of the means employed by a base station to generate diversity by fluctuation of the direction of transmission of the antenna 1. Each signal component $S_1, S_2, \ldots S_M$, intended for a particular terminal 200 or one belonging to a common channel, is produced by a processing pathway comprising a channel coder 3, an interleaver 4, a modulator 5, then a power adjustment module 6. The signal components $S_1, S_2, \ldots, S_M$, delivered by the various processing pathways are subsequently combined by a multiplexing unit 7 into a baseband signal S delivered to the radio transmission stage.

The makeup of the modulators 5 and of the multiplexing unit 7 depends on the multiple access mode employed in the radiocommunication system to which the invention is applied. In a system where the multiple access is by time division (TDMA), as for example GSM, the modulators 5 carry out the modulation in baseband or on an intermediate frequency, whereas the multiplexer 7 distributes the signal components $S_1, S_2, \ldots, S_M$, into respective time slices of the signal frames, corresponding to the various channels. In a system where the multiple access is by code division (CDMA), such as for example UMTS, the modulators 5 can carry out the spectrum spreading by applying the spreading codes assigned to the various channels, whereas the multiplexer 7 simply performs a summation of the signal components $S_1, S_2, \ldots, S_M$.

In the radio stage, a separator 8 reproduces the signal S on each transmission pathway corresponding to a radiating element 2 of the antenna 1. The phase-shifting unit 9 then applies a respective phase shift $D_1, D_2, \ldots, D_N$ to the signal of each transmission pathway. Each phase shift is determined by the position in the antenna 1 of the radiating element 2, and depends on the direction of transmission of the antenna 1 controlled by the transmission pattern controller 10. FR-A-2 792 116 describes an exemplary phase adaptation device usable as a phase-shifting unit 9.

The radio stage subsequently undertakes the conventional operations of filtering, of conversion to analogue 11, of transposition to the carrier frequency 12 and of power amplification 13 on the basis of the signals delivered by the phase-shifting unit 9. Each radiating element 2 then receives from the amplifier 13 associated with it, by way of a duplexer 14, the phase-shifted radio signal $E_1, E_2, \ldots, E_N$ corresponding to its transmission pathway.

The phase-shifting unit 9 can also perform a weighting of the amplitude of the signal corresponding to each transmission pathway. In a manner known to the specialist in radio transmissions, such a weighting makes it possible to modify a width of the transmission pattern by altering the amplitudes of the signals transmitted by each radiating element 2. Thus, during the transmission of the signal by the antenna 1, the angular aperture of the transmission pattern can be modified simultaneously with the fluctuation of the direction of transmission D so as to increase the effectiveness of the diversity creation according to the invention.

Figure 3:
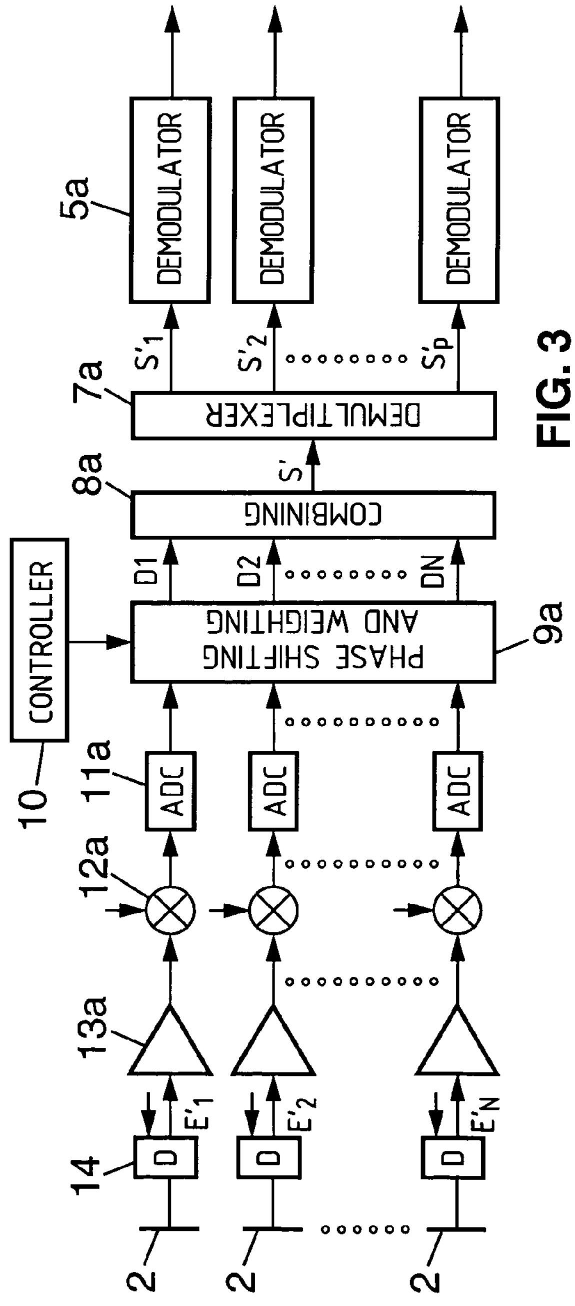
FIG. 3 illustrates a first embodiment of the device used to control the fluctuations in a direction of reception of the antenna.

FIG. 3 shows, in a manner similar to FIG. 2, an example of means usable for the creation of diversity by fluctuation of the direction of reception of the antenna during the reception of radio signals by a base station. The reception antenna 1, composed of antenna elements 2, receives radio signals transmitted by mobile terminals 200. Each radio signal component $E'_1, E'_2, \ldots, E'_N$ received by an antenna element 2 is addressed to the reception pathway associated with this antenna element. This pathway comprises, downstream of the duplexer 14 and of filtering elements (not represented), a low-noise amplifier 13*a*, a frequency transposer 12*a* and an analogue/digital converter 11*a* which delivers the signal component to the phase-shifting unit 9*a*.

This phase-shifting unit 9*a* effects a compensation of the phase shifts, between the signal components of each reception pathway in such a way as to synchronize them at the input of the combining unit 8*a*. This compensation of the phase shifts is governed by the controller 10 as a function of the direction or directions of reception of the antenna 1.

The combining unit 8*a* then groups the signal components emanating from all the reception pathways into a single signal S' and supplies this signal S' to the demultiplexer 7*a*. The latter separates in the signal S' the contributions $S'_1, S'_2, \ldots, S'_p$ corresponding to different transmitting terminals 200, and addresses them respectively to separate processing pathways. Each of these pathways subsequently comprises a demodulator 5*a* and all the standard hardware items necessary for extracting the useful information from the signal received.

In a preferred embodiment of the invention, the fluctuation over time of the direction or directions of transmission and/or of reception of the antenna 1 is performed by discrete jumps, preferably between two predefined directions. This minimizes the disturbances caused to the propagation channel estimation process when the receiver performs coherent demodulation. However, the tracking capabilities for following the movement of a mobile terminal 200, as regards the variations in the impulse response, may render a continuous mode of fluctuation of sinusoidal, triangular or other type equally desirable for the fluctuation of at least one direction of transmission and/or of reception of the antenna 1.

Figure 4:
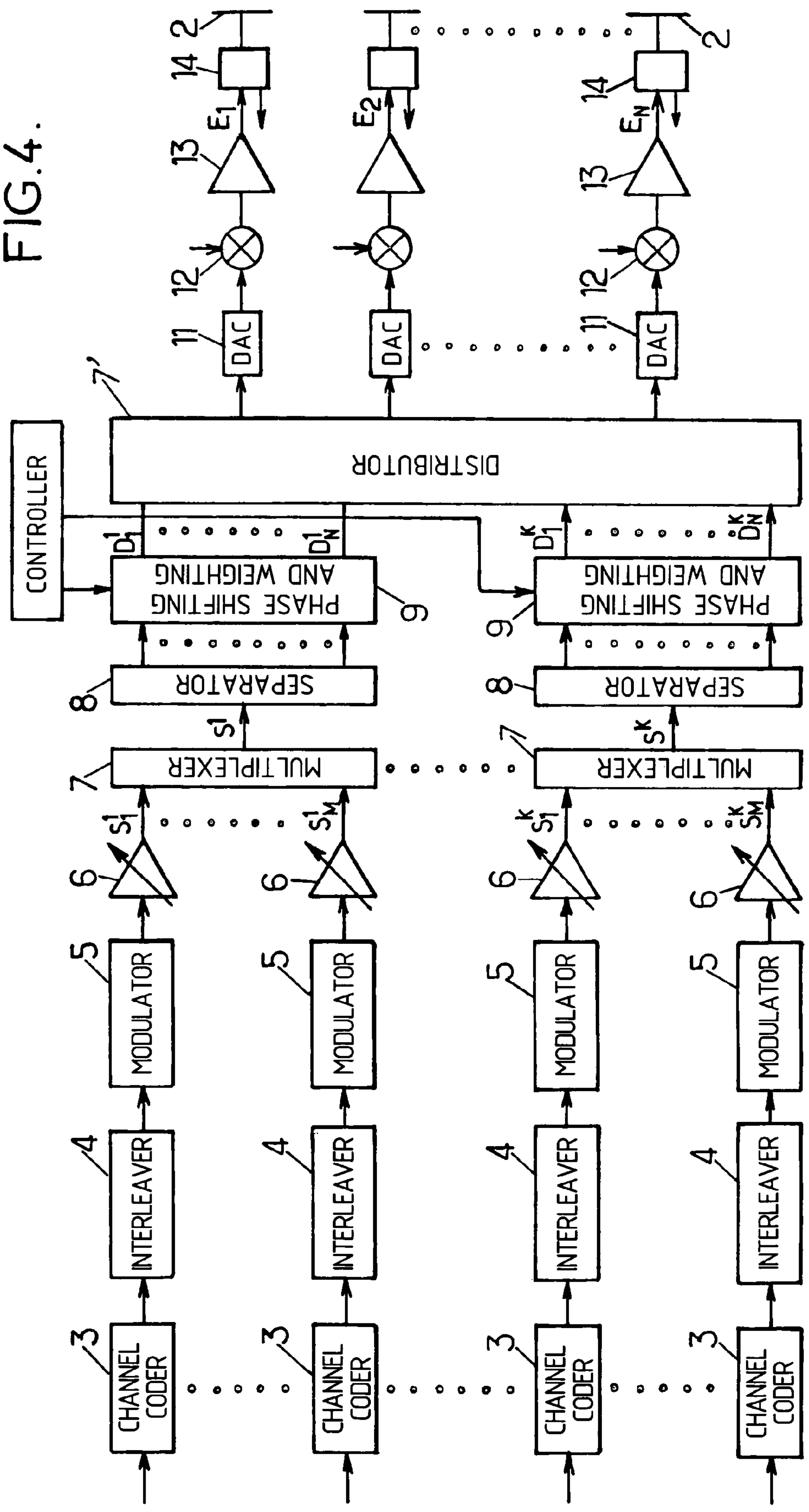
FIG. 4 illustrates a second embodiment of a device used to control the fluctuations in a direction of transmission of the antenna.

FIG. 4 diagrammatically shows a second exemplary embodiment of the means of a base station for generating diversity by fluctuation of the direction of transmission. The references which are common to FIG. 2 correspond to identical means. According to this embodiment, each antenna element 2 receives, through the transmission pathway to which it is linked, a radio signal $E_1, E_2, \ldots, E_N$ to be transmitted, each resulting from several baseband signals $S^1 \ldots, S^K$.

Each of the signals $S^1, \ldots, S^K$ is itself a combination of several signal components. Thus $S^1_1 \ldots, S^1_M$ are the components of the signal $S^1, \ldots$, likewise $S^K_1, \ldots, S^K_M$ are the components of the signal $S^K$, that are produced by as many independent processing pathways. Each processing pathway leads to a multiplexer 7 that produces the signal $S^1, \ldots, S^K$ by combining the components. Each processing pathway comprises the same hardware items as those presented with reference to FIG. 2.

The signal components $S^1_1, \ldots, S^1_M, \ldots, S^K_1, \ldots, S^K_M$ associated with each of the signals $S^1, \ldots, S^K$ may, for example, be multimedia signals intended for a given terminal that is the destination of one of the signals $S^1, \ldots, S^K$. They may also correspond to signals assigned to a given sector served by the antenna.

At the output of each multiplexer 7, the signal $S^1, \ldots, S^K$ is reproduced by a separator 8 so as to form signal contributions associated with each transmission pathway. A phase-shifting unit 9 then applies a phase shift to each signal contribution. By way of example, the phase shift $D^1_1$ is applied to the signal contribution emanating from the signal $S_1$ and associated with the radio signal $E_1$ of the first transmission pathway and, likewise, the phase shift $D^K_N$ is applied to the signal contribution emanating from the signal $S^K$ and associated with the radio signal $E_N$ of the $N^{th}$ transmission pathway. Thus, the radio signal of a specified antenna element 2, for example $E_1$, is the superposition of several elementary radio signals corresponding to the contributions emanating respectively from the independent signals $S^1, \ldots, S^K$. In particular, the respective phase shifts $D^1_1, \ldots, D^K_1$ applied by the phase-shifting units 9 to these various contributions may be different from one another, corresponding to different transmission direction fluctuations ordered by the general controller 10.

The assignment of each phase-shifted signal contribution to the corresponding transmission pathway is performed by a distributor 7'. The distributor 7' possesses an input for each phase-shifted signal contribution, and an output connected to each transmission pathway. It thus addresses to each transmission pathway the signal contributions phase shifted in accordance with the position in the antenna 1 of the antenna element 2 fed by this transmission pathway.

In this second exemplary embodiment, the phase shifts are introduced upstream of the radio stage, thereby allowing easier installation of the phase-shifting units 9, in particular installation of these units at the foot of the antenna 1 in the case where the radio stage is in large part embodied at the antenna level.

Figure 5:
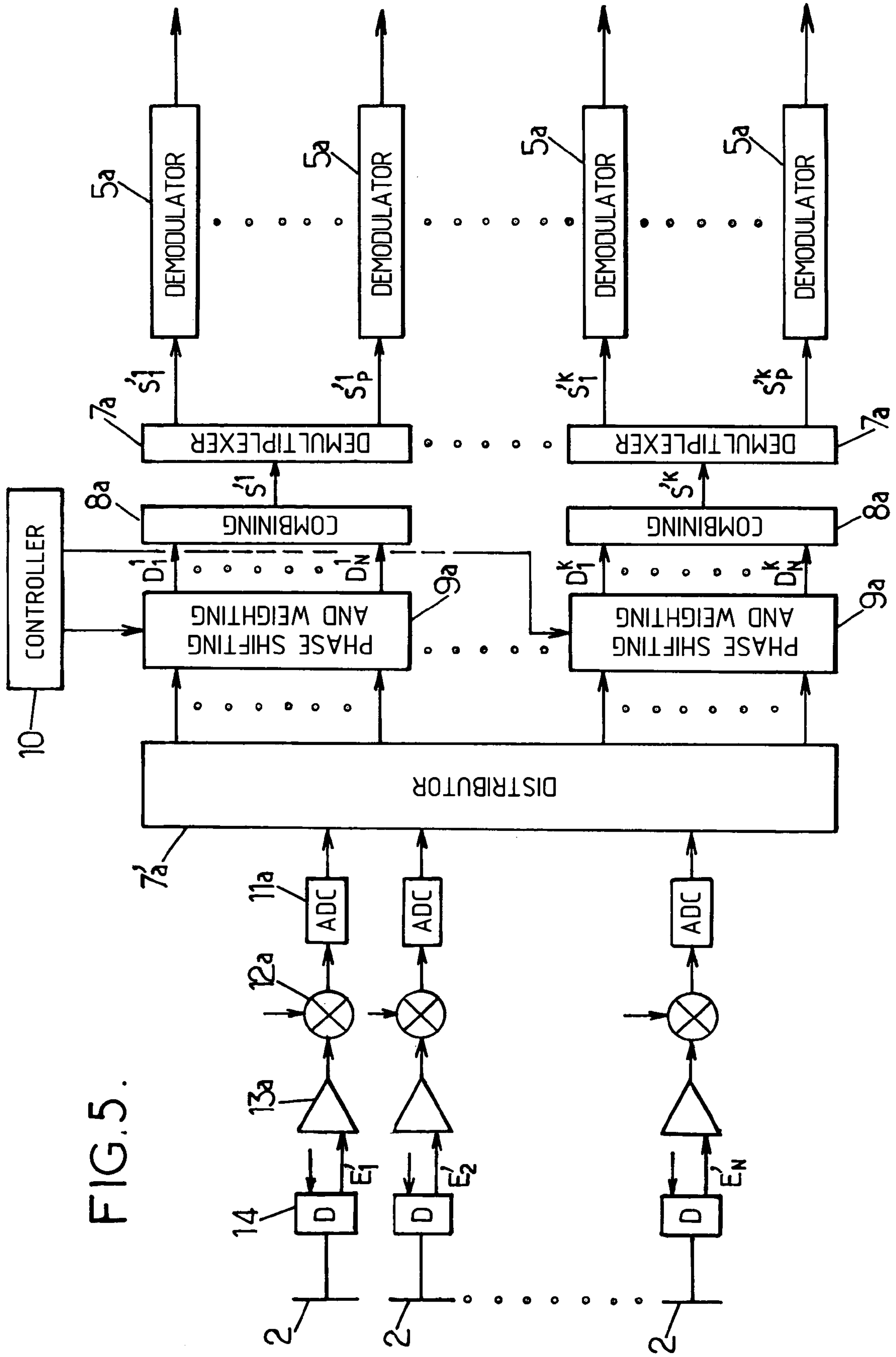
FIG. 5 illustrates a second embodiment of the device used to control the fluctuations in a direction of reception of the antenna.

FIG. 5 corresponds to FIG. 4 in respect of operation in reception which uses the diversity resulting from the fluctuation of the direction of reception of the antenna.

Each antenna element 2 delivers a radio signal $E'_1, E'_2, \ldots, E'_N$, to a radio reception pathway to which it is connected. A duplexer 14, a low-noise amplifier 13*a*, a frequency transposer 12*a* and an analogue/digital converter 11*a* arranged in this radio reception pathway produce a signal component delivered to a distributor 7'*a*. By identification of channel references included in the signal components, elementary components of each signal component corresponding to separate channel references are forwarded respectively to different phase-shifting units 9*a* by the distributor 7'*a*. By intercomparing the elementary components at the level of the inputs of the phase-shifting units 9*a*, the controller 10 then determines the phase shift applied to each of them and orders the corresponding phase-shifting unit 9*a* to compensate for this phase shift. The elementary signal components at the output of a given phase-shifting unit are then synchronized. They are subsequently intercombined by a combining unit 8*a* to obtain a different signal $S'^1, \ldots, S'^P$ per phase-shifting unit 9*a*. Each of these signals $S'^1, \ldots, S'^K$ is then processed independently in the manner already described with reference to FIG. 3. It is in particular separated by a demultiplexer 7*a* into elementary signals $S'^1_1, \ldots, S'^P_K$ corresponding respectively to separate processing channels.

An embodiment according to FIGS. 4 and 5 is well adapted to the case of antennas with beam steering toward mobile terminals. In this case, a multiplexing unit 7 can be allotted to each terminal tracked so as to multiplex the various channels intended for this terminal (this multiplexing unit is not necessary in the case where a single channel is intended for the terminal). The reference direction is then defined for each terminal by means known to the person skilled in the art. The invention makes it possible to superimpose on the relatively slow variation of this reference direction, due to the movements of the terminal, a faster, systematic fluctuation in the direction of transmission about this reference direction, which makes it possible to combat the negative effects of channel fading.

The embodiments illustrated by FIGS. 2 to 5 are merely illustrations of two implementations of the invention. A third implementation consists in imparting a fluctuation in the angle of elevation to the entire transmission pattern of the antenna. This fluctuation is introduced in an analogue or digital manner at the level of the guiding of the angle of elevation of the antennas. This third implementation is consequently particularly simple, given that it requires no modification of the structure or of the operation of the currently existing antennas.

In another likewise possible implementation, the base station generates a single radio signal for the cell, to which signal the phase shifts are applied by means of analogue phase shifters situated between the duplexer and the antenna elements and ordered to cause the directions of transmission and of reception to fluctuate jointly.

The invention claimed is:

1. A radiocommunication base station comprising at least one transmission antenna composed of several radiating elements, production means for producing at least one signal component, transmitting means for addressing, to the radiating elements of the transmission antenna, radio signals generated from the signal components emanating from the production means, means of orientation of a reference direction towards at least one mobile terminal that is the destination of at least one signal component, the transmitting means including phase adaptation means for producing phase shifts in the radio signals addressed to the radiating elements and means of control of a transmission pattern of the antenna by adjustment of said phase shifts, the means of control comprising means for causing at least some of said phase shifts to vary over time in such a way as to induce a systematic fluctuation in the direction of at least one transmission lobe of the antenna about the respective reference direction toward each mobile terminal.

2. The base station as claimed in claim 1, wherein the means of control are devised to control the phase adaptation means in such a way as to cause the direction of the transmission lobe of the antenna to fluctuate by discrete jumps.

3. The base station as claimed in claim 1, wherein the means of control are devised to control the phase adaptation means in such a way as to cause the direction of the transmission lobe of the antenna to fluctuate in a vertical plane.

4. The base station as claimed in claim 1, wherein the means of control are devised to control the phase adaptation means in such a way as to cause the direction of the transmission lobe of the antenna to fluctuate in a horizontal plane.

5. The base station as claimed in claim 1, wherein the means of control are devised to control the phase adaptation means in such a way as to cause the direction of the transmission lobe of the antenna to fluctuate both in a vertical plane and in a horizontal plane.

6. The base station as claimed in claim 1, wherein the means of control are devised to control the phase adaptation means in such a way as to cause the direction of the transmission lobe of the antenna to fluctuate at a frequency greater than the inverse of a duration of interleaving of the signals.

7. The base station as claimed in claim 1, wherein the means of control furthermore comprise means for causing the amplitudes of the signals respectively addressed to the radiating elements of the transmission antenna to vary over time.

8. The base station as claimed in claim 1, comprising means of orientation of the reference direction towards at least one destination terminal for at least one signal component.

9. The base station as claimed in claim 1, wherein the systematic fluctuation in the direction of the transmission lobe is independent of the destinations of the signal components.

10. A radiocommunication base station comprising at least one reception antenna composed of several antenna elements, phase adaptation means for applying respective phase shifts to signal components emanating from the antenna elements, means of orientation of a reference direction towards at least one transmitting mobile terminal sending at least one signal component, means of control of a reception pattern of the antenna by adjustment of said phase shifts, and means for processing at least one signal constructed after combination of the phase-shifted signal components, the means of control comprising means for causing said phase shifts to vary over time in such a way as to induce a systematic fluctuation in the direction of at least one reception lobe of the antenna about the respective reference direction toward each mobile terminal.

11. The base station as claimed in claim 10, wherein the means of control are devised to control the phase adaptation means in such a way as to cause the direction of the reception lobe of the antenna to fluctuate by discrete jumps.

12. The base station as claimed in claim 10, wherein the means of control are devised to control the phase adaptation means in such a way as to cause the direction of the reception lobe of the antenna to fluctuate in a vertical plane.

13. The base station as claimed in claim 10, wherein the means of control are devised to control the phase adaptation means in such a way as to cause the direction of the reception lobe of the antenna to fluctuate in a horizontal plane.

14. The base station as claimed in claim 10, wherein the means of control are devised to control the phase adaptation means in such a way as to cause the direction of the reception lobe of the antenna to fluctuate both in a vertical plane and in a horizontal plane.

15. The base station as claimed in claim 10, wherein the means of control are devised to control the phase adaptation means in such a way as to cause the direction of the reception lobe of the antenna to fluctuate at a frequency greater than the inverse of a duration of interleaving of the signals.

16. The base station as claimed in claim 10, comprising means of orientation of the reference direction towards at least one terminal transmitting a signal fed to the processing means.

17. The base station as claimed in claim 10, wherein the systematic fluctuation in the direction of the reception lobe is independent of the transmitters of the signals fed to the processing means.

* * * * *